May 24, 1938.   H. W. PRICE ET AL   2,118,226
CLUTCH CONTROL MECHANISM
Original Filed Oct. 16, 193
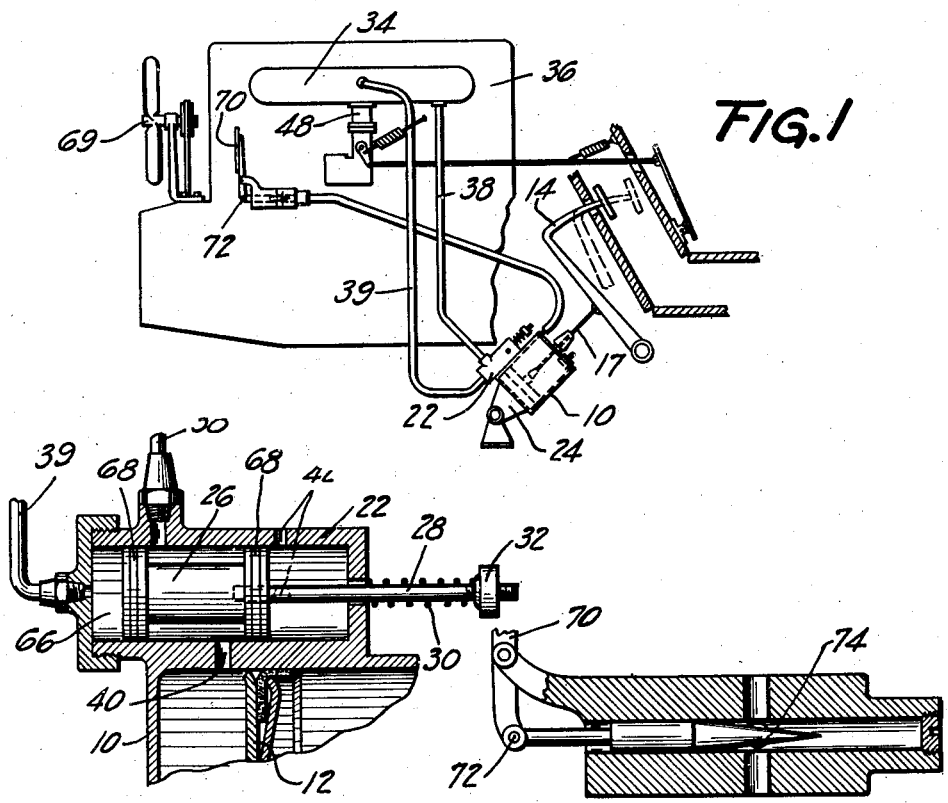
FIG.1
FIG.2
FIG.3
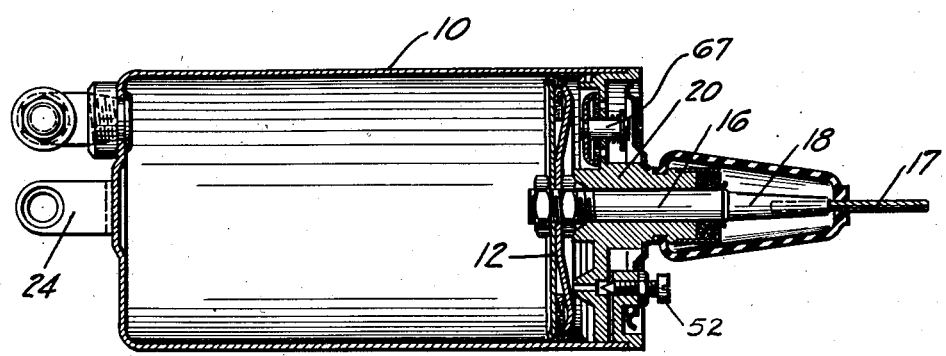
FIG.4
INVENTOR
HAROLD W. PRICE
EARL R. PRICE
BY H. O. Clayton
ATTORNEY Patented May 24, 1938

2,118,226

UNITED STATES PATENT OFFICE 2,118,226

CLUTCH CONTROL MECHANISM

Harold W. Price and Earl R. Price, South Bend, Ind., assignors to Bendix Aviation Corporation, South Bend, Ind., a corporation of Delaware Original application October 16, 1931, Serial No. 569,226. Divided and this application April 19, 1937, Serial No. 137,624

4 Claims. (Cl. 192—.01)

This invention relates in general to control mechanisms and in particular to a vacuum operated clutch controlling mechanism for an automotive vehicle.

One object of the invention is to provide a vacuum operated fluid motor and cooperating valve structure for effecting both a disengagement and a regulated engagement of the clutch, the control valve for said motor being automatically opened by vacuum with the closing of the engine throttle and automatically closed by other means during the opening of the throttle.

More specifically, it is an object of the invention to provide an improved form of power operated valve mechanism actuated by the variations of fluid pressure which effect the movements of the piston of a fluid motor. In the application of the invention illustrated in the drawing, the particular object is to automatically control the connection and disconnection of the drive clutch of an automobile, independent of the conventional clutch pedal manipulation, whereby when the throttle valve is opened the clutch is allowed to gradually and uniformly engage, thereby starting the vehicle without shock, and upon the closing of the throttle valve, as by lifting the operator's foot from the accelerator pedal, the mechanism will automatically disconnect the clutch. By this means the vehicle is controlled solely through the throttle, preferably by means of the accelerator pedal.

The principal object of the invention, however, is to provide a pressure differential operated motor for operating the clutch of an automotive vehicle, the clutch engaging operation of the motor being in part controlled by the conventional cooling fan usually positioned immediately in front of the internal-combustion engine of the vehicle.

Other objects of the invention and desirable details of construction and combinations of parts will become apparent from the following description of a preferred embodiment, which description is taken in conjunction with the accompanying drawing, in which:

Figure 1 is a diagrammatic view disclosing the essential elements of the invention;

Figure 2 is a longitudinal sectional view through the automatically operable control valve for the fluid motor of the invention, the valve parts being shown in their open position;

Figure 3 is a longitudinal sectional view through the valve controlling the clutch engaging operation of the power means; and Figure 4 is a sectional view disclosing the fluid motor of the power means in detail.

The present invention relates to mechanism adapted to actuate the clutch pedal against the tension of its spring, not shown, to thereby disengage the clutch elements and likewise adapted to automatically govern the reengagement of the driving clutch element under the influence of the clutch spring, the latter thereby controlling the retractive movement of the clutch pedal.

In that embodiment of the invention disclosed in the drawing there is provided a clutch operating fluid motor comprising a double-ended cylinder 10, disclosed in detail in Figure 4, having therein a reciprocatory piston 12 operatively connected with a conventional clutch pedal 14 by a rigid rod 16 and flexible cable 17. The rod is preferably provided with a tapered end portion 18, the entire rod being reciprocable within a bored hub portion 20 projecting from the end 20 of the cylinder 10. This construction is not claimed herein, being more fully described in our United States Letters Patent No. 1,996,256, dated April 2, 1935.

The cylinder 10 is provided at one end with a valve cylinder 22 rigidly secured thereto as by casting, and within which cylinder there is provided the movable valve parts for controlling the operation of the fluid motor. The end of the cylinder is provided with a projection 24 pivotally secured to a fixed portion of the chassis.

Mounted to reciprocate within the valve cylinder 22 there is provided a spool-shaped plunger or piston member 26, the connecting rod 28 of which passes through one end of the cylinder, a return spring 30 being interposed between the outer face of the cylinder and a stop 32 on the piston rod to urge the piston to the right or closed position. The cylinder 22 is connected to one end of the intake manifold 34 of an internal-combustion engine 36 by a flexible conduit 38 and is also connected by conduit 39 with the manifold at a point just above the carburetor 48. Communication between the motor and valve is provided by an opening or port 40. Atmospheric ports 42 adjacent the right end of the valve cylinder serve to deenergize the motor to permit the clutch engagement.

Describing the operation of the mechanism, closing of the throttle by the release of the accelerator pedal effects the creation of a vacuum in the manifold by the pumping action of the engine pistons. As is well known in the art, this evacuated condition of the manifold is employed as a source of sub-atmospheric pressure in the operation of accessories, such as the wind shield wiper and fuel storage vacuum tank.

A partial vacuum is thus immediately induced in the valve compartment 66 at the left of the valve member 26, this action being accelerated by virtue of the connection of conduit 39 with the manifold 34 at a point just above the carburetor, an area of maximum vacuum. The connection of conduit 38 at the end of the manifold and the mounting of the valve on the motor accentuate this effect by virtue of the rate of air flow between the several parts of the mechanism. The spool valve member 26 is thus automatically urged to the left under the pressure of the atmosphere, compressing spring 30 and registering the port 40 with the conduit 38, which position of the valve parts is disclosed in Figure 2. The valve is thus opened to effect an evacuation of the motor and a disengagement of the clutch, the motor piston 12 assuming the position shown in dotted lines in Figure 1. A one-way check valve 67 of conventional structure insures the movement of the piston during the clutch disengaging operation, the piston impelling air entering the actuator via said valve prior to the opening of the bore in hub 20.

Upon opening the throttle, for example, after the shifting of gears, the gaseous pressure within the manifold and valve compartment 66 is increased, tending to approach normal atmospheric pressure whereupon the valve spring 30 moves the valve member 26 to the right to vent the actuator via atmospheric ports 42 and port 40. The clutch spring then functions to reengage the clutch, the movement of the driving clutch plate being controlled, however, by the variable throttle control of the efflux of air from the compression or right side of the actuator piston 12.

This control is effected by virtue of the entry of the tapered end 18 of rod 16 within the hub 20, by the adjustment of a needle valve 52 placed in the end wall of the cylinder 10 and by a fan operated bleed valve described in detail hereinafter. There is thus provided a definite mode of clutch engagement, depending upon the adjustment of the valve 52 and the mode of operation of the fan operated bleed valve.

The valve member 26 may be provided with friction rings 68 to obviate an undue degree of movement with slight changes in manifold vacuum caused, for example, by the temporary cutting out of one or more engine cylinders.

Referring to both the engagement and disengagement of the clutch, the relative timing of the throttle and clutch operations may be varied by changing any one of the many variables, such as the idle setting of the throttle, the relative sizes of the valves and actuator, strength of springs, etc.

In Figures 1 and 3 there are disclosed means for controlling the engagement of the clutch wherein a conventional cooling fan 69 of the engine serves to propel or blow air upon a shield or baffle 70, the latter being pivotally mounted at 72 and serving to actuate a needle valve member 74 pivotally connected thereto. The degree of opening of the needle valve and the proportionate rate of clutch engagement is, therefore, made a function of the R. P. M. of the fan which is geared to the engine. The rate of clutch engaging movement of the driving clutch plate is thus a function of the speed of the engine, which speed is, in large measure, controlled by the accelerator.

The invention heretofore described is disclosed in our copending application Serial No. 569,226, filed October 10, 1931, this application constituting a division thereof.

While one illustrative embodiment has been described, it is not our intention to limit the scope of the invention to that particular embodiment, or otherwise than by the terms of the appended claims.

We claim:

1. In a clutch control mechanism for an automotive vehicle provided with an internal-combustion engine, a cooling fan and a clutch, a fluid motor operatively connected with the clutch, means cooperating with the engine for effecting a disengagement of the clutch, said means including the aforementioned fluid motor, and other means cooperating with the motor and fan for controlling the engagement of the clutch.

2. In a clutch control mechanism for an automotive vehicle provided with an internal-combustion engine, a cooling fan and a clutch, a fluid motor operatively connected with the clutch, means cooperating with the engine for effecting a disengagement of the clutch, said means including the aforementioned fluid motor, and other means cooperating with the motor and fan for controlling the engagement of the clutch, said latter means including a baffle member and further including a valve member operated by said baffle member.

3. In a clutch control mechanism for an automotive vehicle provided with an internal-combustion engine, a cooling fan and a clutch, a fluid motor operatively connected with the clutch, means cooperating with the engine for effecting a disengagement of the clutch, said means including the aforementioned fluid motor, and other means cooperating with the motor and fan for controlling the engagement of the clutch, said latter means comprising fluid transmitting means for venting said motor to the atmosphere and further comprising a fan controlled valve means incorporated within said fluid transmitting means.

4. In a clutch control mechanism for an automotive vehicle provided with a clutch, an internal-combustion engine and a conventional cooling fan for said engine, power means for operating the clutch, and valve means operated by said fan for controlling the clutch engaging operation of said power means.

HAROLD W. PRICE.
EARL R. PRICE.